United States Patent [19]

Mayse et al.

[11] 3,898,537
[45] Aug. 5, 1975

[54] MODULAR HIGH VOLTAGE DC POWER SUPPLY WITH A REMOVABLE COMPONENT RACK

[75] Inventors: Weldon D. Mayse; Joseph D. Winslow, Jr., both of Houston, Tex.

[73] Assignee: Petrolite Corporation, St. Louis, Mo.

[22] Filed: June 7, 1974

[21] Appl. No.: 477,402

[52] U.S. Cl. .................. 317/103; 204/302; 321/8 C
[51] Int. Cl. ........................ H02m 7/00; H05k 5/00
[58] Field of Search ......... 204/302; 174/18; 317/99, 317/100, 103, 120; 321/8 R, 8 C, 15

[56] References Cited
UNITED STATES PATENTS

| | | | |
|---|---|---|---|
| 2,656,403 | 10/1953 | Sealey | 174/18 |
| 3,205,161 | 9/1965 | Turner | 204/302 |
| 3,372,325 | 3/1968 | Wahlgren | 321/8 C |

*Primary Examiner*—Gerald P. Tolin
*Attorney, Agent, or Firm*—Emil J. Bednar

[57] ABSTRACT

A high voltage DC power supply for an electrical field treater which includes a hermetically sealed metal enclosure filled with transformer oil immersing a removable rack. The rack has a high voltage transformer mounted upon a base and a vertical guideway receiving one or more voltage multiplier modules which can be inserted therein in only one orientation. Terminal connectors are provided upon an insulated base mounted on the rack and each voltage multiplier unit carries superimposed and subtended complementary terminal connectors. Voltage multiplier units can be readily mounted within the rack for increasing proportionately the DC voltage output of the power supply. The uppermost voltage multiplier module carries a superimposed connector which permits receipt of a mating connector at the end of a flexible lead for conducting high potential current to a high voltage bushing mounted in the wall of the metal enclosure. This arrangement permits the ready installation of the power supply on an electrical field treater, facilitates repairs and simplifies changing the output DC voltage as desired.

6 Claims, 4 Drawing Figures

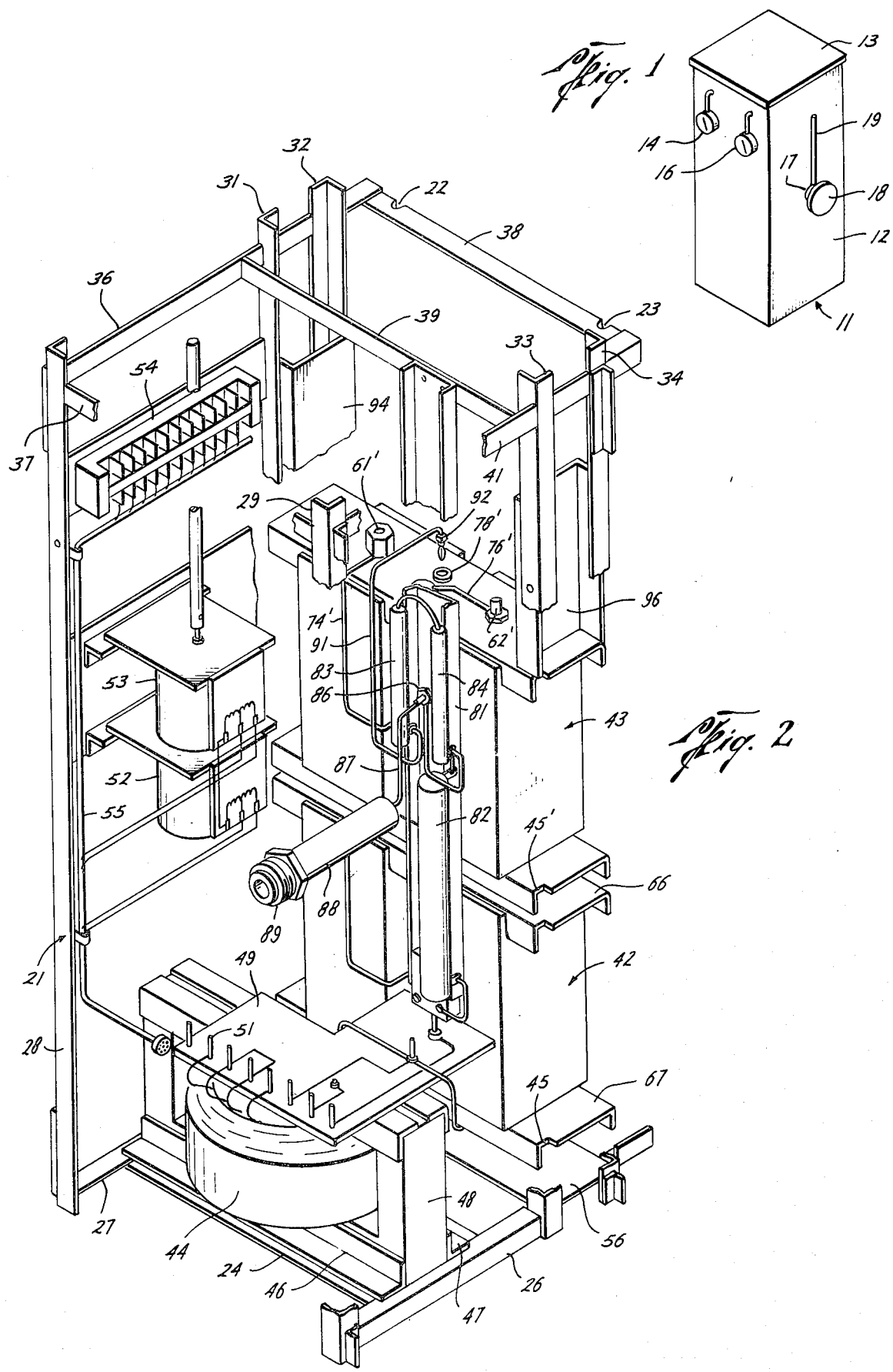

MODULAR HIGH VOLTAGE DC POWER SUPPLY WITH A REMOVABLE COMPONENT RACK

BACKGROUND OF THE INVENTION

1. Field of the Invention

This invention relates to the resolution of dispersions with electrical field treaters, and more particularly, to a unique high voltage power supply constructed in a modular form for use with such treaters.

2. Description of the Prior Art

Electrical field treaters for the resolution of distillate-type hydrocarbon dispersion have been employed commercially for many years. In particular, these treaters efficiently resolve a dispersion of a distillate hydrocarbon, such as kerosene, which contains a dispersed phase such as a basic or acidic aqueous medium. Electrical field treaters of the type shown in U.S. Pat. No. 3,205,161 have been employed commercially in refineries and chemical plants for resolving distillate hydrocarbon dispersions. In electrical field treaters of this type, the electrode configuration is energized by an external DC power supply.

The DC power supply generally has been constructed in a unitary fashion. More particularly, a metal rack containing the transformer, rectifiers, capacitors, and resistor network was fabricated into an integral unit. Then, the rack assembly was placed within a metal case and secured therein by bolting. The metal case ultimately was filled with transformer oil and sealed hermetically by a removable waterproof cover. Power connections for the energization of the DC power supply were provided. Also, an insulated bushing and cable conductor was provided for conducting high voltage current through the wall of the metal case to the electrical field treater. For this purpose, a flanged pocket in the sidewall of the metal case provided connection of a complementary flanged conduit carrying an insulated electrical conductor as shown in U.S. Pat. No. 2,881,125, the conductor connected by the insulated bushing to the output terminal of the high voltage DC power supply to the energized electrode contained in the electrical field treater.

Usually, the DC power supply contained some arrangement, such as a multiprimary transformer or an auxiliary variable voltage transformer, for varying the output potential of the DC power supply. For example, the DC power supply could be constructed to provide a maximum output potential of 35 kilovolts. The variable transformer could be adjusted to provide the output potential at a selected value between 35KV and 1000 volts or some other minimum voltage permitted by the rectifiers employed in the DC power supply.

If it became necessary to increase the output potential of the DC power supply, it had to be removed from the electrical field treater, drained of transformer oil, and the entire rack assembly removed as a separate module. Then, the DC power supply could be reconstructed by substitution of transformer, rectifiers, etc., to obtain the particular high potential output desired. In the past, electrical field treaters of the type herein described have usually operated with the electrodes energized between 30 and 35 kilovolts. However, some treaters have operated with a maximum DC potential of 15 kilovolts. In other installations, between 50 and 60 DC kilovolts energization of the electrodes was required. A change in the dispersion resolved by the electric treater could necessitate a reconstruction of the DC power supply to provide the necessary maximum DC potential for energization of electrodes. Alternatively, a defect could develop in the DC power supply which necessitated complete disassembly and field repair, or shipment to a factory for repair. In either event, severe manual effort is required since the DC power supply usually has a weight of 600 pounds or above.

The present high voltage DC power supply avoids the above listed disadvantages of the conventional DC power supply heretofore employed with electrical field treaters. In particular, the present high voltage DC power supply has a modularized construction so that the DC power supply can be readily repaired in the field and rapidly changed to provide several different maximum DC potentials for energization of electrodes. Because of their modular construction, these high voltage DC power supplies, irrespective of output potential, have basically similar construction and allow a ready substitution of basic parts employed in their fabrication.

SUMMARY OF THE INVENTION

In accordance with this invention, there is provided a high voltage DC power supply for an electrical field treater such as is shown in U.S. Pat. No. 3,205,161. The DC power supply has an open top metal case which is filled with transformer oil and hermetically sealed with a removable waterproof cover. The metal case contains a removable rack carrying a base and a plurality of upright supports forming a vertical guideway. One or more voltage multiplier modules are received within the guideway which is keyed so that these modules can be installed in only one orientation. The rack contains a base carrying a transformer which has a primary winding connectable to a source of power and a secondary winding connected to terminal connectors carried upon an insulated base member. These terminals form AC and DC inputs to each of the voltage multiplier modules received within the vertical guideway. At least one voltage multiplier module is received within the vertical guideway and carries superimposed and subtended complementary terminal connectors for receipt upon the terminal connectors of the insulated base member. The superimposed and subtended complementary terminal connectors are oriented in pairs so that when a plurality of voltage multiplier modules are mounted in superimposed relationship, an electrical interconnection exists between the modules and the secondary winding of the transformer. Each voltage multiplier module has top and bottom insulator members which enclose capacitors and rectifiers with integral wiring thereby forming a voltage multiplier stage. One pair of superimposed and subtended complementary conductor terminals forms electrical interconnection to AC input and output terminals from the secondary winding of the transformer. The other pair of superimposed and subtended complementary terminal forms electrical interconnection of the DC input and output terminals of each module and the secondary winding of the transformer. A flexible conduit having a mating connector at one end connects to resistor network forming the DC output of power supply. Each voltage multiplier module carries a superimposed connector to receive the mating connector on the flexible conductor. The mating connector connects to the DC output of the voltage multiplier module and is received in the superimposed connector on the topmost module in the vertical guideway. An upright insulating member carries the flexible conductor and the resistor network within the rack. A high voltage output bushing is mounted in the wall of the case for conducting high voltage current to an external electrical field treater. The interior terminal of the entrance bushing is connected to the resistor network.

DESCRIPTION OF THE DRAWINGS

FIG. 1 is a perspective view of the present high voltage DC power supply ready for connection to an electrical field treater;

FIG. 2 is a pictorial view in elevation of the removable rack contained within the metal case illustrated in FIG. 1;

DESCRIPTION OF SPECIFIC EMBODIMENTS

Figure 3:
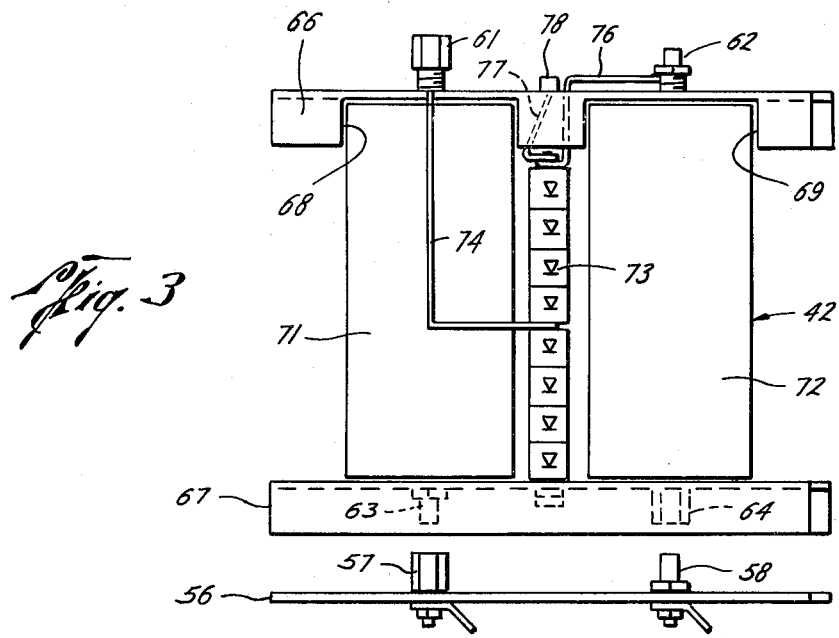
FIG. 3 is an elevation view of one voltage multiplier module employed within the DC power supply illustrated in FIG. 2.

Referring now to the drawings, an embodiment of the high voltage DC power supply of the present invention will be described. In FIG. 1, there is shown a high voltage DC power supply 11 of the present invention. The DC power supply comprises an open top metal case 12 which is filled with transformer oil and hermetically sealed with a removable waterproof cover 13. The cover 13 is secured to the case 12 by any convenient means such as wing nuts or the like. The DC power supply includes external voltage and current meters 14 and 16, respectively. The flange connection 17 is mounted on one sidewall of the case 12 to provide for connection of the DC power output of the power supply 11 to the electrodes of an electrical field treater. As illustrated, the flange connection 17 is temporarily closed with a removable flange cover 18 which provides protection of the unit during shipment. The cover 18 is removed at the destination and a conduit cable connection is made thereto as shown in U.S. Pat. Nos. 3,205,161 and 2,881,125 for transfer of the high potential DC current from the power supply 11 to the electrodes of an electrical field treater. The flange connection 17 may also carry an upstanding closed top pipe 19 which provides an easy mode for checking the level of transformer oil within the case 12. Although not illustrated in FIG. 1, the usual terminals are carried within one sidewall of the case 12 to permit connection of primary power source conductors to the power supply 11.

Referring now to FIG. 2, the novel modular assembly of the rack and various components which provide the high potential DC current for the power supply 11 are illustrated. A metal rack 21 is dimensioned so as to be removably mounted within the case 12. Once the rack 21 is positioned within the case 12, it can be secured by passing machine screws into holdout clamps through bolt openings 22 and 23. The rack 21 may be of any suitable construction, but preferably is formed integrally of angle irons of adequate dimensions to support the remaining components of the power supply 11. The rack 21 has a plate or base 24 mounted integrally to bottom members 26 and 27 of the rack 21. These bottom members are secured to a plurality of upright members 28, 29, and 31 through 34. The upper portions of the rack 21 are provided by strap members 36, 37, 38, 39 and 41. Thus, the rack 21 has horizontal and vertical members integrally connected into a rectangular configuration. The upright members 31, 32, 33 and 34 form a vertical guideway within the rack 21. One or more voltage multiplier modules are received within the vertical guideway which carries a keying means so that each module can be installed in one orientation. Any suitable keying means may be employed for this purpose. A simple keying means is obtained by having the upright member 33 spaced more closely to the upright member 34 than the spacings between the upright members 31 and 32. With this arrangement, the voltage multiplier modules have a cutout in horizontal components, which cutout is designated by the numeral 45. Thus the modules may be placed with the vertical guideway in only one orientation. The rack 21 is shown with voltage multiplier modules 42 and 43. These modules can be identical and only module 42 will be described in detail. However, like components in module 43 bear identical numbers to those in module 42, but these numerals are designated by a prime, e.g., 62'.

A transformer 44 is mounted upon the base 24 by angle iron supports 46 and 47 secured to the core 48 of the transformer. The transformer 44 has a terminal board 49 carrying a plurality of lugs 51 which connect to its primary and secondary windings. The lugs 51 provide interconnections to a source of power and for connection of the secondary winding to the other components of the power supply 11. The source of power can be 440 volts single-phase primary conductors which are commonly employed within refinery electrical systems. However, the primary winding could be operated from other voltage sources. Preferably, the primary of transformer 44 is connected to the source of power through some device for adjusting the primary voltage. Preferably this device is an autotransformer. In order to maintain a balanced relationship of the source of power to the primary transformer 44, a pair of variable autotransformers 52 and 53 are interconnected between the source of power and the primary winding of the transformer 44.

In order to simplify the connections for the various electrical circuits within the rack 21, the external source of power and the meters 14 and 16, a multiterminal strip 54 is mounted onto the rack 21. The use of the terminal strip 54 simplifies the electrical connections of the power supply 11. A cable 55 carries the various electrical conductors which provide necessary electrical connections.

The secondary winding of the transformer 44 is connected to terminal connectors upon an insulating board 56 mounted at the lower extremity of the rack 21. In momentary reference to FIG. 3, the insulating board 56 carries terminals 57 and 58, which connect to the ends of the secondary winding of transformer 44. The terminal connectors 57 and 58 form the AC and DC inputs, respectively, to each of the modules 42 and 43.

All of the voltage multiplier modules preferably are of the same component construction. However, some component variation may be employed, such as in the capacitance of the capacitors employed within these modules. However, the physical size of these modules should be substantially identical. Referring to FIG. 3, the module 42 carries superimposed and subtended complementary terminal connectors 61 through 64. The terminal connectors are oriented in pairs 61 and 62, and 63 and 64, respectively, so that the module can be mounted in superimposed relationship with electrical interconnection being effected through the complementary terminal connectors. Thus, the module 43 mounted atop the module 42 effects interconnection through the oriented pair of terminal connectors 61 and 62. In a similar fashion, the module 42 obtains electrical interconnection with the terminal connectors 57 and 58 through the terminal connectors 63 and 64, respectively.

The terminal connectors preferably are of the pin and socket types which permit some lateral movement without destruction of the electrical interconnection between the module. Plug and jack types making friction-fit electrical connections may be employed, if desired. Alternatively, the terminal connections can be nonpolarized, such as button-type metal electrodes which engage vertically by abutment into a low resistance electrical interconnection solely by weight of the modules. Other arrangements of the terminal connectors obviously can be employed which provide for the same result as has been described for the modules 42 and 43.

The construction of the modules employs a unique arrangement of structural and electrical members producing compact voltage multiplier stages. For this purpose, the module 42 is provided with rigid top and bottom insulator members 66 and 67. The insulator members 66 and 67 can be of any electrical and structural material suitable for present purposes, but preferably are provided by channel-shaped glass reinforced, epoxy resin plastic material. Cutouts 68 and 69 are provided in the insulator member 66 to accommodate the components of the module. The insulator members 66 and 67 enclose a pair of capacitors 71 and 72 and a plurality of rectifiers 73. Preferably, the capacitors 71 and 72 are high voltage designs having rectangular cases formed of Micarta$^{TM}$ containing the capacitance forming elements (metal foil) immersed in a dielectric material such as transformer oil. Also, these capacitors are provided with upper and lower threaded terminals to receive the connectors 61, 62, 63 and 64, respectively. The terminal connectors not only provide the complementary electrical interconnections for the module, but also threadedly secure the various elements into a rigid integral structure. In addition to these connections, a conductor 74 extends from the midspan of the rectifiers 73 to the terminal connector 61. One end of the rectifiers 73 is connected by a lead beneath member 67 to the terminal connection 64. The upper end of the rectifiers 73 connects by a lead 76 to the terminal connector 62 and by a second conductor 77 to a superimposed connector 78 carried in the insulator member 66 atop the module 42. With this arrangement, it is obvious that the insulator members 66 and 67 not only provide a structural component of the module 42, but provide also an insulating function of the voltage multiplier stage provided by this module.

The terminals 63 and 61 form electrical interconnections to the AC input and output terminals, respectively, of module 42 and the AC end of the secondary winding of the transformer 44. The terminals 64 and 62 provide for an electrical interconnection to the DC input and output terminals, respectively, of module 42 and the DC end of the secondary winding of the transformer 44. For purposes of this description, the terminal connector 57 on the insulated board 46 can be considered the AC input terminal and the AC end of the secondary winding of the transformer for each of the modules. The terminal connector 58 on the insulator board 56 provides the DC input terminal and the DC end of the secondary winding of the transformer 44 to the modules. Thus, the terminal connectors form complementary pairs of superimposed and subtended units for electrical interconnection of the modules to one another and to the terminal connectors 57 and 58.

On the uppermost module, e.g., module 43, carried within the vertical guideway in the rack 21, the superimposed connector 78' provides the DC output of the modules. A suitable connection carries the high potential DC current from the connector 78' to the electrical field treater through the sidewall of the case 12. Preferably, the following arrangement shown in FIG. 2 is employed for this purpose. The rack 21 carries an upright insulating member 81 secured between upper and lower horizontal supports. The insulating member 81 can be of the same material as the insulating members 66 and 67 of the module 42. Mounted upon the insulating member 81 are a plurality of resistors 82, 83, and 84, serving as voltmeter multiplier and current limiters, respectively. These resistors are connected by suitable leads to the respective terminal connectors of the power supply 11. The resistor network contains an output terminal 86 connected by a lead 87 to a high voltage output bushing 88 mounted within the sidewall of the case 12 by a threaded fitting 89 in flanged connection 17. The bushing 88 passes high tension current in electrical isolation through the sidewall of the case 12. One end of the resistors is connected by a flexible conductor 91 which carries a mating connector 92 for receipt within the connector 78' carried atop the module 43. This lead permits a ready interconnection of the uppermost module through the resistor network and to the entrance bushing 88. If desired, a similar connection can be provided between the lead 87 and the terminal 86.

The number of voltage multiplier modules installed within the vertical guideway of the rack 21 is limited only by the vertical dimension of the guideway. The modules can be positioned in only one orientation in this vertical guideway. As a result, the terminal connectors will always produce the proper electrical interconnections with the remainder of the circuitry of the power supply 11. The mating connector 92 is inserted without difficulty into the connector 78 atop the uppermost module even when submerged in transformer oil. Thus, all of the electrical connections are readily affected within the rack 21 irrespective of the number of voltage multiplier modules installed within the power supply 11.

In shipping the power supply 11, hold-down retainers 94 and 96 can be secured above the topmost module. These hold-down members may employ friction catches, bolts, or the like to maintain them in place in the rack 21.

If it becomes desirable to remove the entire rack 21, the cover 13 is removed from the case 12. The lead 87 is removed from the terminal 86, and the retaining bolts removed from the openings 22 and 23 on the rack 21. The connections between the meters 14 and 16 at the terminal strip 54 are severed with the rack 21 partially lifted from the case 12. At this time, the connection of a primary source to the transformer 44 is also disconnected from the terminal strip 54. Then, the rack 21 is lifted from the case 12.

Figure 4:
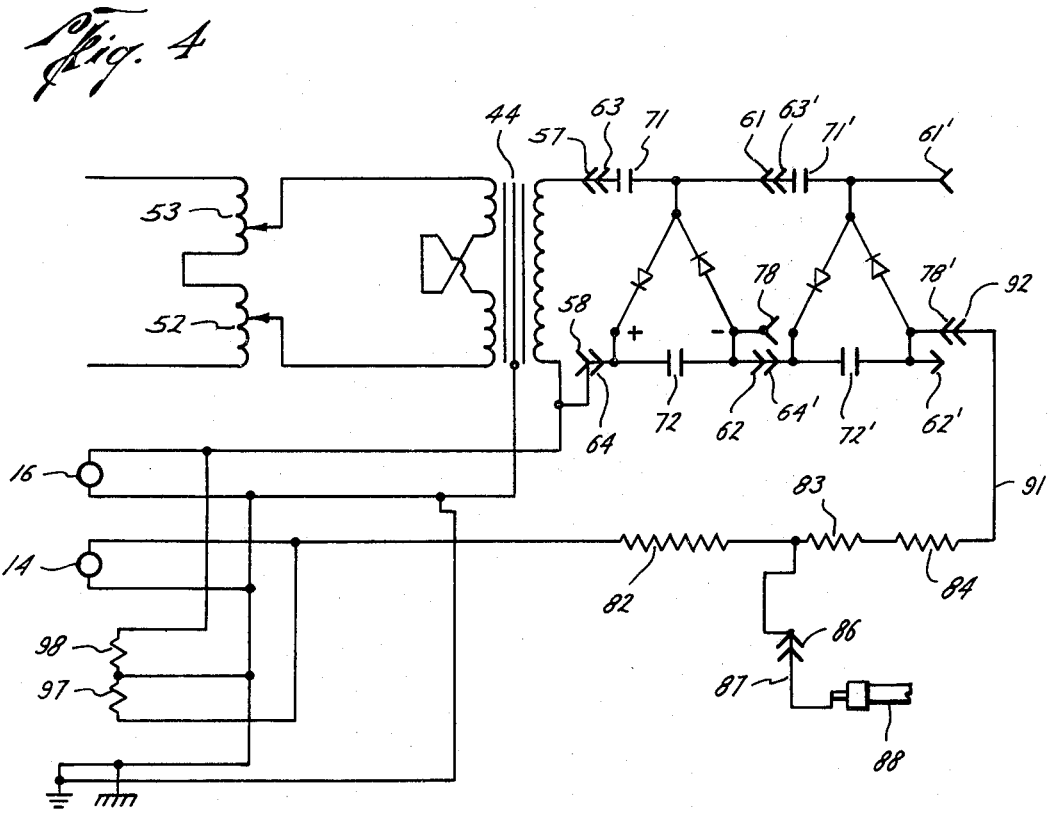
FIG. 4 is an electrical schematic of the DC power supply shown in FIG. 2.

The circuitry of the power supply 11 is shown in FIG. 4 wherein the elements previously described are denoted by like reference numerals. In the circuitry, the terminal connectors which have been described for each module are shown in a complementary chevron configuration with the associated capacitors and rectifiers. The upper end of the secondary of the transformer 44 is the AC input at terminal connector 57 to the modules. The lower end of the secondary winding is the DC input at terminal connector 58 to the modules. It will be apparent that the modules have AC input and output terminal connectors 63 and 61, and DC input and output terminal connectors 64 and 62 in series with the uppermost module. The DC output is taken by connector 92 through the lead 91 from the resistors and applied to the bushing 88. The resistor 82 serves as a "bleeder resistor" for the circuitry. Resistors 97 and 98 are shown in shunt with the meters 14 and 16 and electrical ground.

The addition of identical modules to the rack 21 provides potentials at a slightly decreased value below the arithmetic sum of voltages from the total number of modules employed. For example, one module can provide an output potential of 30 kilovolts; adding a second identical module provides an output of 58 kilovolts; and adding a third identical module provides a maximum output potential of 85 kilovolts. This arrangement is typical of the Cockcroft-Walton's ladder type of high voltage DC power supply. Thus, the present invention allows any number of voltage multiplier modules to be inserted into the rack 21 to provide a corresponding maximum output potential from the power supply 11. The selective addition of modules provides, by a simple and speedy effort, any necessary maximum potential in an electrical field treater for resolving distillate hydrocarbon dispersions. Also, the power supply can be operated at the highest voltage and lowest current for maximum efficiency. For example, the power supply 11 initially provides only the module 42 with an output potential of the maximum of 30 kilovolts. At some other time, the electrical field treater receives a different type of dispersion wherein the electrodes must be at potentials substantially above this magnitude. At such time, the module 43, or even a third module, is installed within the power supply 11 without any serious disassembly or alteration or reconstruction in the unit. Should the power transformer 44 or nonmodule component become defective, the rack 21 can be readily removed from the case 12 and repaired in the field or by substitution of a new rack assembly.

Various modifications and alterations in the described high voltage power supply will be apparent to those skilled in the art from the foregoing description which do not depart from the spirit of the invention. For this reason, these changes in structure are desired to be included within the scope of the present invention. The appended claims define the present invention; this description is to be employed for setting forth the specific embodiments as illustrative in nature.

What is claimed is:

1. A high-voltage DC power supply for an electrical field treater comprising:

a. an open-top metal case adapted to be filled with transformer oil and carrying a removable waterproof cover secured thereto;

b. a rack removably mounted within said metal case, said rack having a base and a plurality of upright supports forming a vertical guideway receiving at least one voltage multiplier module, said vertical guideway carrying keying means whereby each said voltage multiplier module is installed in said vertical guideway in only one orientation;

c. a transformer mounted upon said base within said rack and having a primary winding connectable to a source of power and a secondary winding connected to terminal connectors carried upon an insulated base member mounted on said rack, said terminals forming the AC and DC inputs to each said voltage multiplier module;

d. said at least one voltage multiplier module received within said vertical guideway and carrying superimposed and subtended complementary terminal connectors received on said terminal connectors on said insulated base member, said superimposed and subtended complementary terminal connectors being oriented in pairs whereby a plurality of voltage multiplier modules can be mounted in a superimposed relationship with electrical interconnection being effected by said complementary terminal connectors;

e. each voltage multiplier module having top and bottom insulator members enclosing capacitors and rectifiers with integral wiring therein forming a voltage multiplier stage, one pair of superimposed and subtended complementary terminals forming electrical interconnection to AC input and output terminals from said secondary winding of said transformer and another of said pairs of superimposed and subtended complementary terminals forming electrical interconnection to DC input and output terminals and said secondary winding of said transformer, a flexible conductor having a mating connector at one end and connected to a resistor network at the other end forming the DC output of the power supply, each voltage multiplier module carrying a superimposed connector receiving the mating connector on said flexible conductor, said mating connector connected to the DC output of said voltage multiplier module and received in the superimposed connector on the topmost voltage multiplier module in said vertical guideway;

f. an upright insulating member carrying said flexible conductor and said resistor network; and g. a high voltage output bushing mounted in a wall of said case for conducting high-voltage current to an external electrical field treater, and the interior terminal of said bushing connected to said resistor network.

2. The power supply of claim 1 wherein each said voltage multiplier module includes a coupling capacitor connected to the AC input terminal, a filter capacitor between the DC input and output terminals, a pair of series connected rectifiers across said filter capacitor and at the common connection of said rectifiers connected to the AC output terminal.

3. The power supply of claim 1 wherein each said voltage multiplier module comprises top and bottom insulator members secured to a pair of canister capacitors having terminal means connected threadedly through said insulator members to said complementary terminals and electrical wiring between said insulator members connecting said rectifiers, capacitors, complementary terminal connectors, and superimposed connector.

4. The power supply of claim 1 wherein a variable transformer means is mounted on said rack for adjustment of the voltage applied to the primary of said transformer from said power source.

5. The power supply of claim 1 wherein said insulator members of each said voltage multiplier module are channel-shaped, glass reinforced, epoxy resin plastic material.

6. The power supply of claim 1 wherein said complementary terminal connectors are like pairs of male-female units with one pair in superimposed relationship at each side of said voltage multiplier module and a complementary male-female unit carried on the top and bottom insulator members.

* * * * *